United States Patent
Hui et al.

(10) Patent No.: US 9,473,412 B2
(45) Date of Patent: Oct. 18, 2016

(54) DYNAMIC TRAFFIC SHAPING BASED ON PATH SELF-INTERFERENCE

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 14/284,500

(22) Filed: May 22, 2014

(65) Prior Publication Data

US 2015/0341275 A1 Nov. 26, 2015

(51) Int. Cl.
| | |
|---|---|
| *H04L 12/815* | (2013.01) |
| *H04L 12/64* | (2006.01) |
| *H04B 3/32* | (2006.01) |
| *H04B 3/54* | (2006.01) |
| *H04L 12/54* | (2013.01) |
| *H04J 3/10* | (2006.01) |

(52) U.S. Cl.
CPC ............... *H04L 47/22* (2013.01); *H04B 3/32* (2013.01); *H04B 3/54* (2013.01); *H04B 3/542* (2013.01); *H04L 12/6418* (2013.01); *H04B 2203/5425* (2013.01); *H04J 3/10* (2013.01)

(58) Field of Classification Search
CPC ..... H04L 12/6418; H04B 3/542; H04B 3/54; H04B 3/32; H04J 3/10
See application file for complete search history.

(56) References Cited

U.S. PATENT DOCUMENTS

| 8,515,382 B2 | 8/2013 | Schwager et al. |
| 2004/0136379 A1* | 7/2004 | Liao ............ H04L 12/5695 370/395.21 |
| 2008/0144484 A1* | 6/2008 | Sourani ............ H04B 3/32 370/201 |
| 2012/0161543 A1 | 6/2012 | Reuven et al. |
| 2012/0182881 A1 | 7/2012 | Ananthakrishnan et al. |
| 2012/0213124 A1* | 8/2012 | Vasseur ............ H04L 41/12 370/255 |
| 2013/0051446 A1 | 2/2013 | Vijayasankar et al. |
| 2013/0179124 A1* | 7/2013 | Patel ............ G01R 31/2825 702/190 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Omer S Mian
(74) *Attorney, Agent, or Firm* — Parker Ibrahim & Berg LLC; James M. Behmke; Stephen D. LeBarron (57) ABSTRACT

In one embodiment, a method is disclosed in which a device in a network receives self-interference information from one or more nodes in the network. A degree of self-interference along a communication path in the network is determined based on the received self-interference information. A packet to be sent along the communication path is also identified and traffic shaping is performed on the communication path based on the degree of self-interference along the path.

19 Claims, 12 Drawing Sheets

DYNAMIC TRAFFIC SHAPING BASED ON PATH SELF-INTERFERENCE

TECHNICAL FIELD

The present disclosure relates generally to computer networks, and, more particularly, to mechanisms for shaping network traffic flow based on self-interference experienced along a communication path.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

In some cases, an LLN device may communicate simultaneously using multiple link technologies, such as radio frequency (RF), power line communication (PLC), and/or cellular. Link technologies common to LLN deployments also typically communicate on shared media. For example, LLN devices may communicate on different electrical phases of a tri-phase electrical system using PLC transceivers. For these reasons, different pairs of devices communicating within close physical proximity may interfere with each other, resulting in a type of interference called self-interference. Unlike interference due to external sources (e.g., environmental conditions, etc.), self-interference is a form of localized interference that can be attributed to the network itself. Particularly in the context of LLNs, it is challenging and difficult to devise network solutions that account for the effects of self-interference between devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method is disclosed in which a device in a network receives self-interference information from one or more nodes in the network. A degree of self-interference along a communication path in the network is determined based on the received self-interference information. A packet to be sent along the communication path is also identified and traffic shaping is performed on the communication path based on the degree of self-interference along the path.

In further embodiments, a method is disclosed in which the performance of a communication link between network nodes is monitored. The presence of self-interference associated with the communication link is also identified and reported to a traffic shaping device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
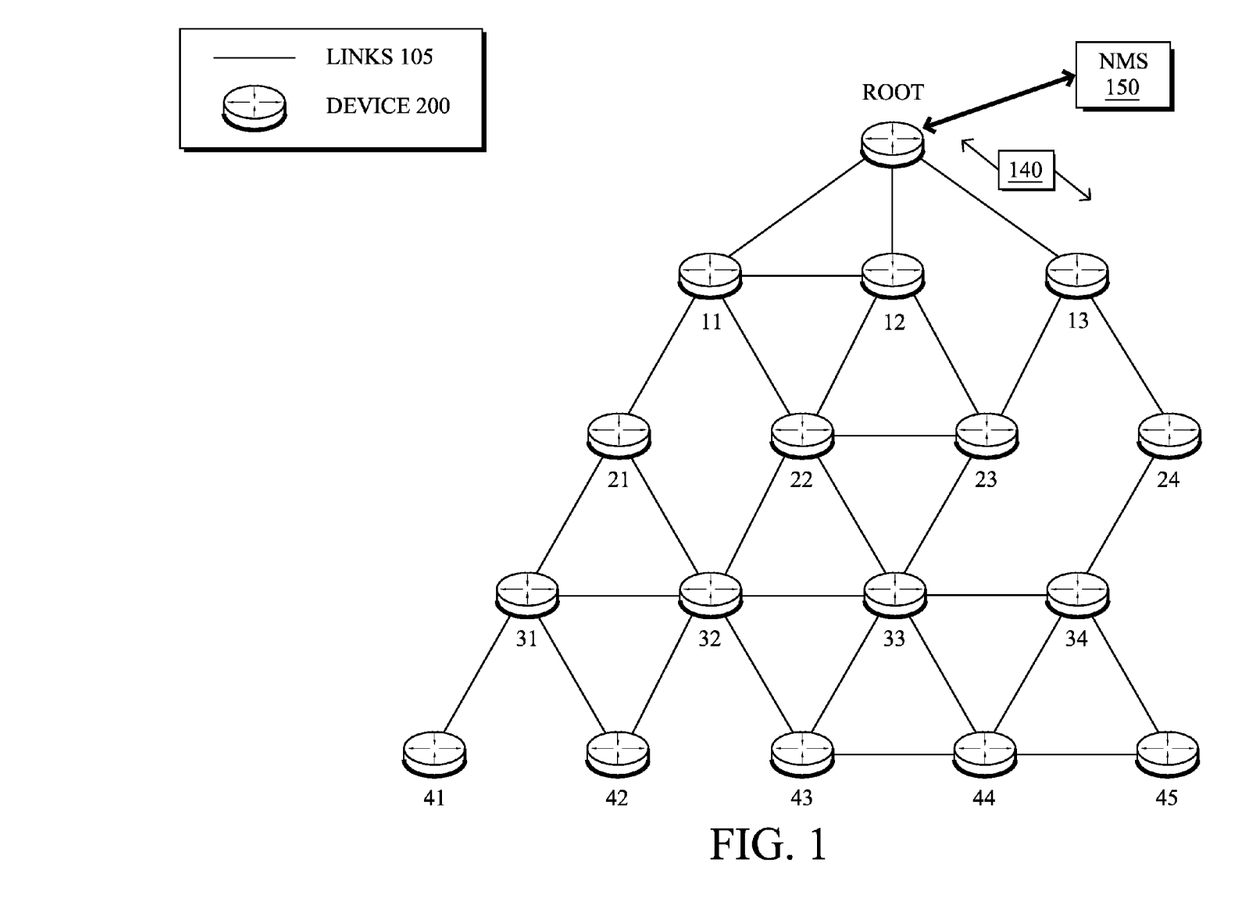
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, Wi-Fi, Bluetooth®, etc.), PLC protocols, or other shared-media protocols where appropriate. In this context, a protocol consists of a set of rules defining how the nodes interact with each other.

Figure 2:
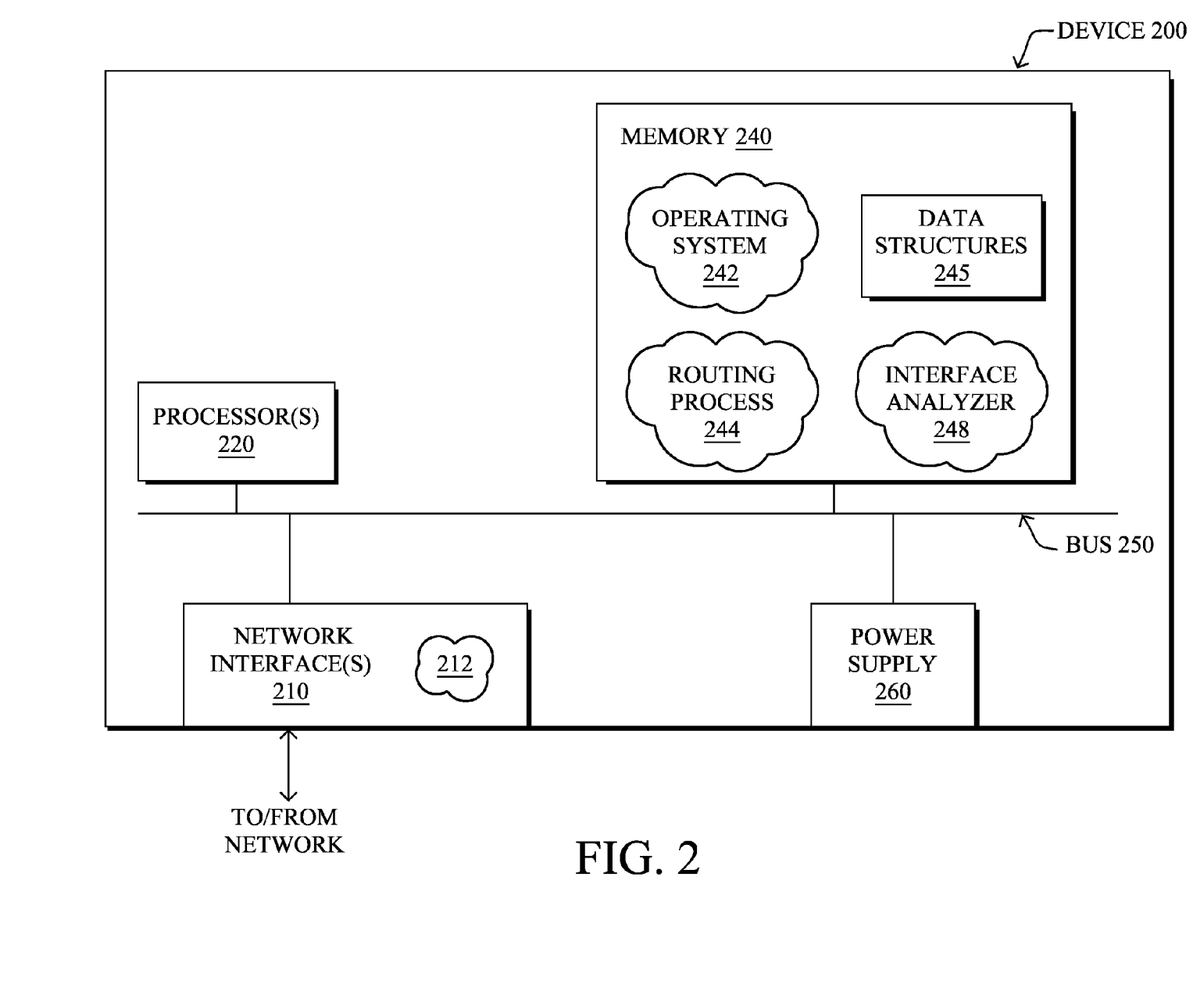
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. In other words, device 200 may communicate with another network device using two or more different communication technologies/physical layers (e.g., wireless, PLC-based, etc.). Also, while the network interface 210 is shown separately from power supply 260, for PLC the network interface 210 may communicate through the power supply 260, or may be an integral component of the power supply. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an interference analyzer 248, as described herein. Note that while processes 244, 248 are shown in centralized memory 240, alternative embodiments provide for the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Interference analyzer process 248 generally includes the instructions executed by the processor 220 to detect, analyze, and/or report the existence of self-interference, as described in greater detail below. Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are included in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Figure 3:
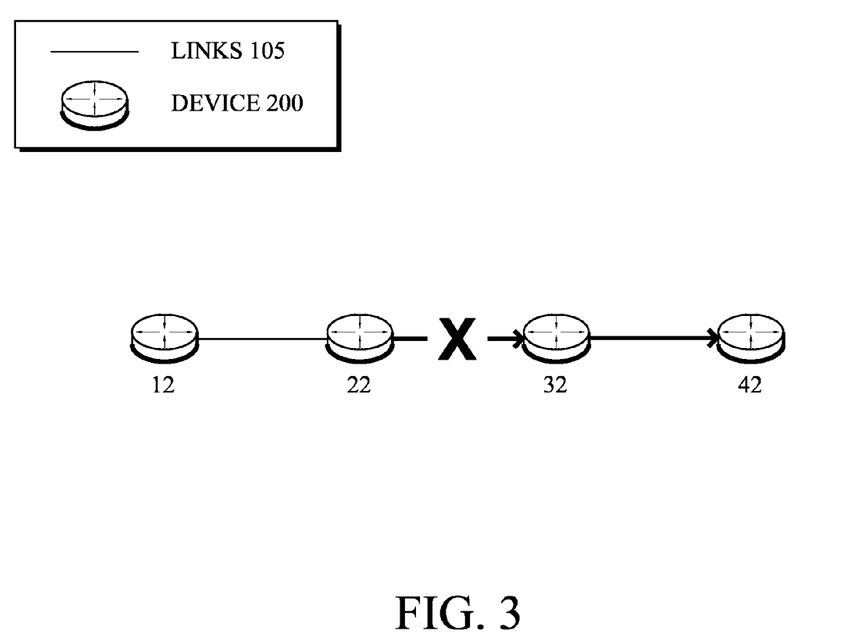
FIG. 3 illustrates an example of self-interference along a communication path.

Another distinguishing characteristic of LLNs and other forms of shared media networks is the increased possibility of self-interference conditions within the network. In general, self-interference occurs when communications between different pairs of network nodes/devices within close physical proximity interfere with one another. One example of a self-interference condition is illustrated in FIG. 3. As shown, assume that nodes/devices 12, 22, 32, and 42 communicate wirelessly using a half-duplex setup. In such a setup, a device can only receive or transmit at any given time, regardless of which wireless channels are used. For example, assume that wireless communications to and from node 32 are half-duplexed and that node 32 is currently transmitting data to node 42. In such a case, data cannot be received by node 32 from node 22 at the same time, thereby causing a self-interference condition.

Figure 4:
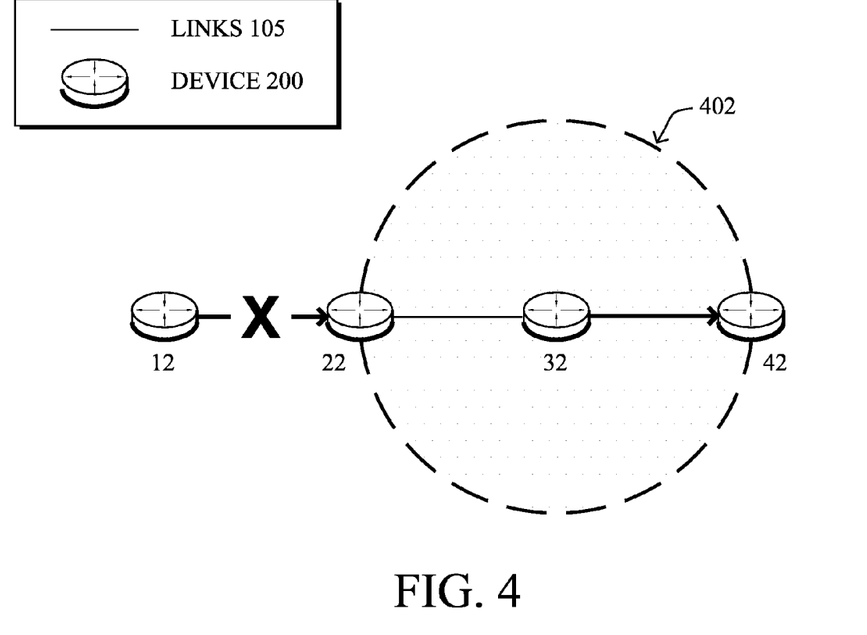
FIG. 4 illustrates another example of self-interference along a communication path.

FIG. 4 illustrates another example of a self-interference condition along a communication path. As shown, assume that each of nodes 12, 22, 32, and 42 independently determine their own channel hopping schedules. Such a schedule may indicate the channel on which a node may receive data at a particular point in time. To facilitate communications between the nodes, each node may share its channel hopping schedule with its neighboring devices. Thus, node 12 may not have knowledge of the channel usage of nodes 32, 42 and vice versa. Now, assume that node 32 is communicating data to node 42 using a particular channel and that node 32 has a transmission range 402. In such a case, a self-interference condition may be present if node 12 attempts to communicate with node 22 using the same channel, since node 22 is also within transmission range 402 of node 32.

Figure 5:
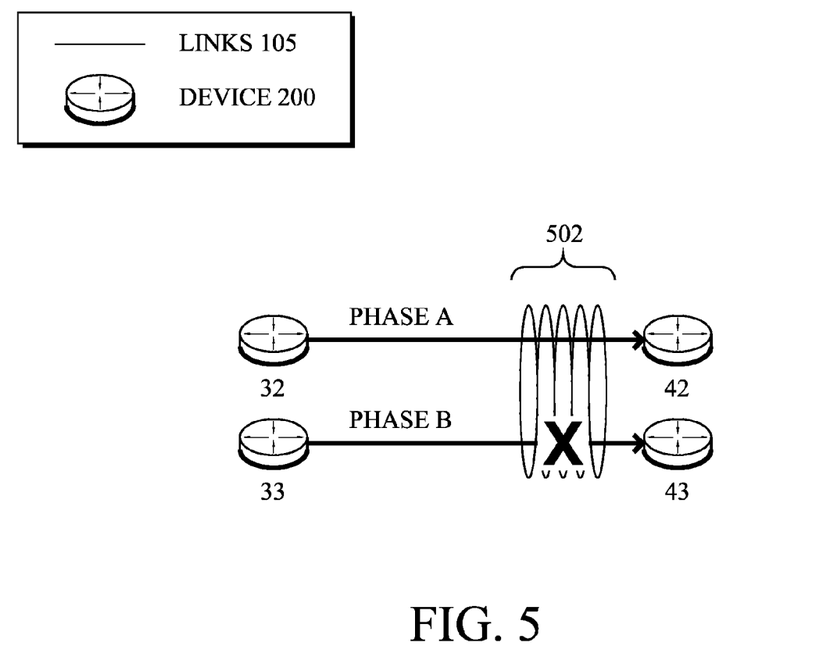
FIG. 5 illustrates an example of self-interference due to crosstalk between adjacent PLC links.

Self-interference conditions may also be present in other forms of shared media, such as PLC links. For example, as shown in FIG. 5, nodes 32, 33, 42, and 43 may communicate on a given electrical phase present in the power line system. In particular, node 32 may communicate with node 42 on first electrical phase (phase A) and node 33 may communicate with node 43 on a second electrical phase (phase B) on adjacent communication links. In some cases, crosstalk 502 may present, meaning that the data transmitted on phase A makes its way onto phase B or vice-versa. The degree of crosstalk between electrical phases may vary in both the time and space domains. Thus, a self-interference condition due to crosstalk 502 may exist if node 33 attempts to transmit data to node 43 when node 32 is transmitting data to node 42.

Figure 6:
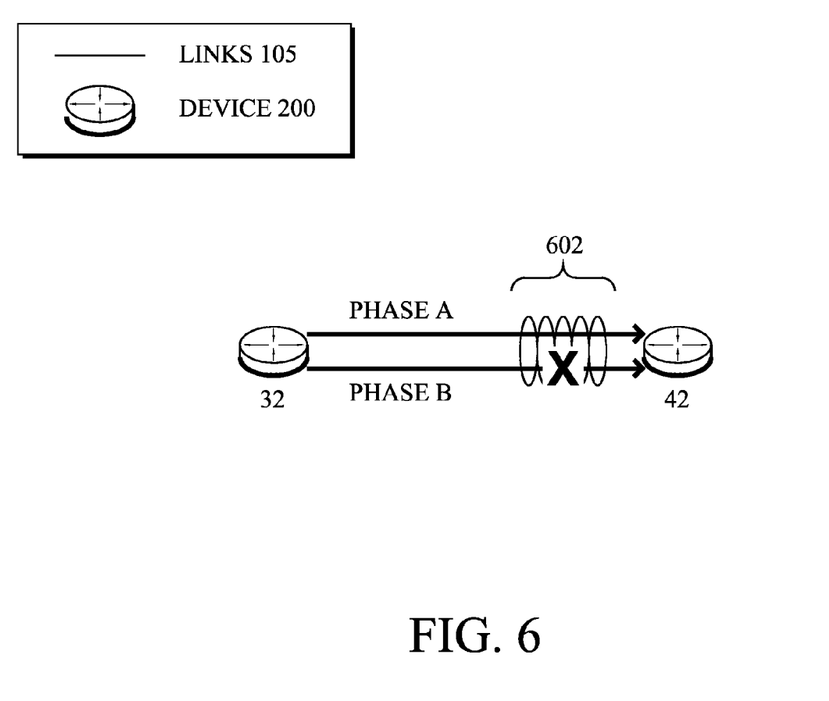
FIG. 6 illustrates an example of self-interference due to crosstalk between different electrical phases.

In some cases, a given PLC device may use different electrical phases to transmit data to a neighboring device simultaneously. As shown in the example of FIG. 6, assume that nodes 32, 42 are both connected to electrical phases A and B. Thus, node 32 may use both phases A and B, to communicate data to node 42. However, a self-interference condition may result if node 32 attempts to use both phases at the same time and crosstalk 602 exists between the two phases.

As noted above, self-interference conditions present unique challenges in shared media networks, such as LLNs. In particular, the presence of self-interference is often unpredictable in such networks and may vary with time.

Dynamic Traffic Shaping Based on Path Self-Interference

The techniques herein provide for the dynamic adjustment of traffic shaping policies used within a network, such as an LLN, based on the degree of self-interference that occurs along communication paths within the network. In one aspect, data regarding the degree of self-interference along a path and between adjacent paths may be reported to a traffic shaping device, such as a path computation engine (PCE), DODAG Root, etc. In another aspect, the traffic shaping device may dynamically adjust traffic shaping policies used in the network for delivering packets along a given communication path. In another aspect, traffic shaping may also be applied to adjacent communication paths that are used simultaneously, based on the reported self-interference. In a further aspect, packet scheduling may be adjusted based on the self-interference. In yet another aspect, feedback may be provided to the traffic shaping device regarding self-interference and used as part of a closed-loop control mechanism for the applied traffic shaping.

In general, traffic shaping is a technique that delays some or all datagrams to match a desired traffic profile. In other words, traffic shaping is a form of rate limiting and is especially important in networks that have limited resources (e.g., LLNs). A Traffic shaper may be parameterized by a desired traffic profile and is often implemented using leaky bucket or token bucket algorithms. A number of input/output traffic shaping techniques have been developed in the past for many types of link layers (e.g., ATM, FR, IP, etc.).

Specifically, according to one or more embodiments of the disclosure as described in detail below, a method is disclosed in which a device in a network receives self-interference information from one or more nodes in the network. A degree of self-interference along a communication path in the network is determined based on the received self-interference information. A packet to be sent along the communication path is also identified and traffic shaping is performed on the communication path based on the degree of self-interference along the path.

Illustratively, the techniques described herein may be performed by hardware, software, and/or firmware, such as in accordance with the processes 244, 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, techniques are disclosed whereby traffic shaping polices may be adjusted and enforced based on the degree of self-interference that occurs along paths used to deliver packets in a network. In particular, the degree of self-interference along a path may be quantified, reported to a traffic shaping device (e.g., a PCE, DODAG Root, etc.), and used to adjust network traffic shaping policies based on the degree of self-interference.

Figure 7:
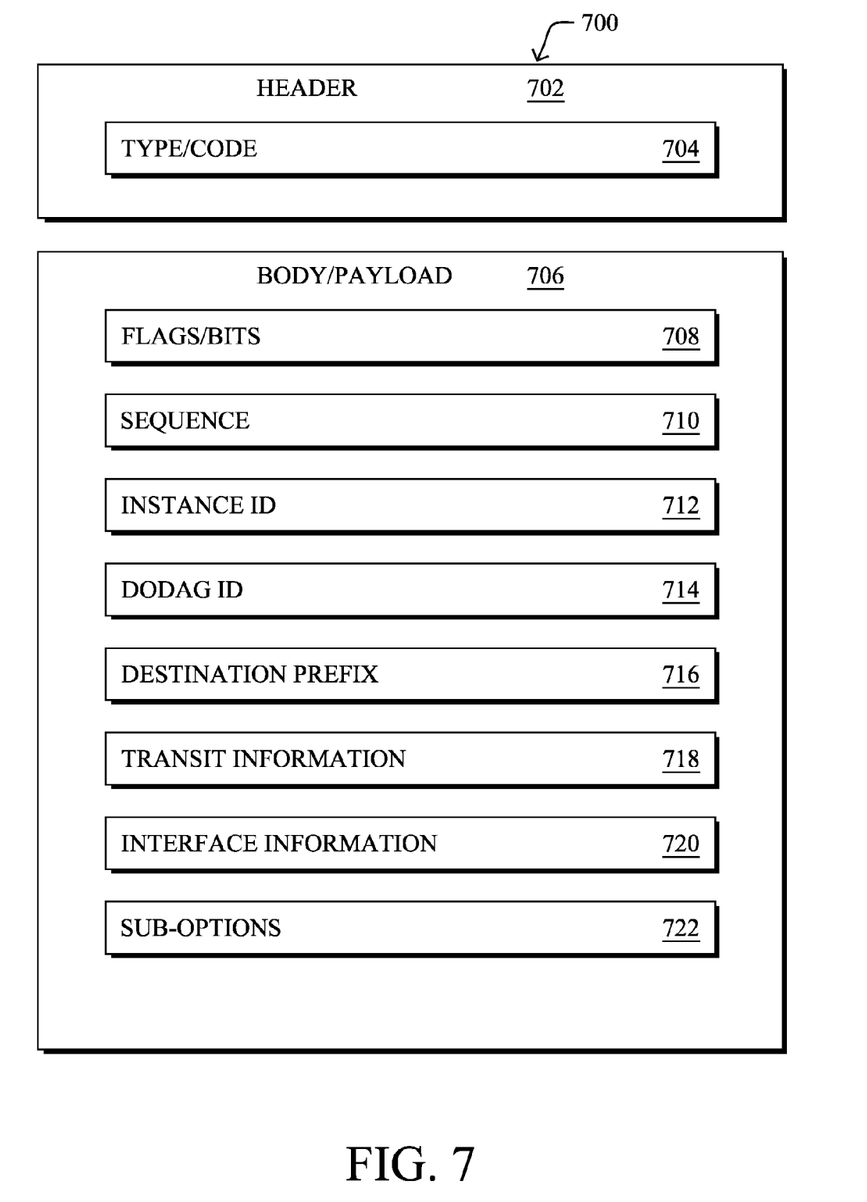
FIG. 7 illustrates an example message.

FIG. 7 illustrates an example format for a message 700 that may be used for discovery and route dissemination when building a DAG, e.g., as a DAO message. Message 700 illustratively comprises a header 702 with one or more fields 704 that identify the type of message (e.g., a RPL control message), and a specific code indicating the specific type of message (e.g., as a DAO message). Within the body/payload 706 of the message may be a plurality of fields used to relay the pertinent information. In particular, the fields may comprise various flags/bits 708, a sequence number 710, an instance ID 712, a DODAG ID 714, destination prefixes 716, and/or a transit information field 718, among others (e.g., DAO_Sequence used for ACKs, etc.). One or more additional sub-option fields 722 may also be used to supply additional or custom information within message 700.

In various embodiments, message 700 may include self-interference information 720 that includes information regarding self-interference associated with a given communication path. In one embodiment, self-interference information 720 may simply indicate whether a communication link between a node and its DODAG parent exhibits self-interference (e.g., a node/device may indicate whether the device has detected self-interference). For example, in the case of crosstalk, a device may be configured to determine that crosstalk exists between electrical phases and include an indication of such in interference information 720. In another embodiment, interference information 720 may be further augmented with the link or set of links that exhibit crosstalk effects (e.g., a node/device may identify both the presence of self-interference as well as determining where the interference is occurring). In further embodiments, interference information 720 may include information that may be used by a central network device (e.g., root, NMS, etc.) to detect the presence of self-interference. As would be appreciated, crosstalk introduces dependencies between different physical communication media. Thus, message 700 may be sent to a traffic shaping device, such as a path computation engine (PCE), DODAG Root, or other network node, and used to determine self-interference along a communication path in the network.

In some cases, interference information 720 may include link information regarding which links/physical layers a particular device is using or is capable of using. For example, interference information 720 may indicate whether the device is able to use one or more PLC links or a wireless connection with another device. Interference information 720 may further include information regarding the links, such as the hopping schedule of a wireless link, signal strength information, information regarding dropped packets, etc. In some cases, a device may not be able to identify self-interference on its own. In such cases, a central network device (e.g., traffic shaper, PCE, etc.) may use the link information from different devices along a path to identify the presence of self-interference. In cases in which a node/device detects self-interference on its own, the central device may still use interference information 720 to verify the determination. In further embodiments, the central device may use the link information to identify points along the path that may exhibit self-interference, regardless of whether self-interference has actually occurred (e.g., devices in close proximity using the same communication media).

The degree of self-interference may be reported to (e.g., as determined by the node/device and included in interference information 720), or otherwise identified by, a traffic shaping device in any number of ways. In other words, the reporting node and/or the central device may determine the degree of self-interference. In one embodiment, the degree of self-interference may correspond to the number of links along a path that experience self-interference with one or more links along the path. In another embodiment, the degree of self-interference may correspond to the maximum number of consecutive links along a communication path that experience self-interference. Such a representation may be useful since the overall throughput along a path is reduced in proportion to the number of consecutive links that experience self-interference. For example, when a path includes two consecutive links that experience self-interference, the overall throughput is reduced by half. Similarly, when a path includes three consecutive links that experience self-interference, the overall throughput is reduced to only one-third. While a path that includes more than three consecutive links that experience self-interference can service one-third the traffic in theory, in practice the throughput is further reduced due to the likelihood that packet drops, random backoffs, etc. will amplify the effects of self-interference. In yet another embodiment, the self-interference may be represented by the distribution of links along the path that experience self-interference. For example, if a path has two sets of links that experience self-interference, the sets are more likely to introduce additional delays in aggregate when they are closer together in the same path. One brute force approach that may also be used is to simply list all links along a path and indicate whether or not they experience self-interference with any neighboring links.

Figure 8A:
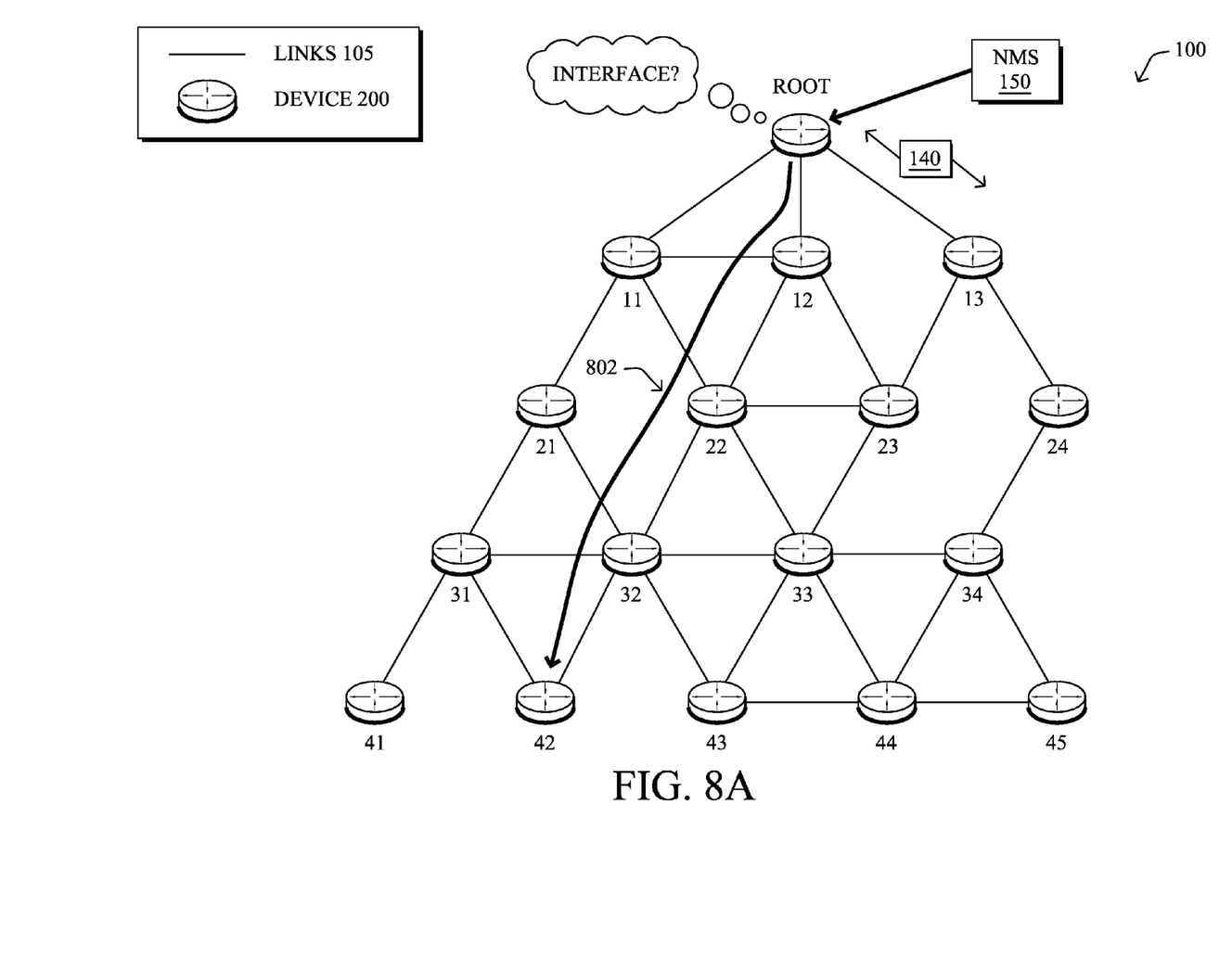
FIGS. 8A-8B illustrate an example of traffic shaping being performed along a communication path.
Figure 8B:
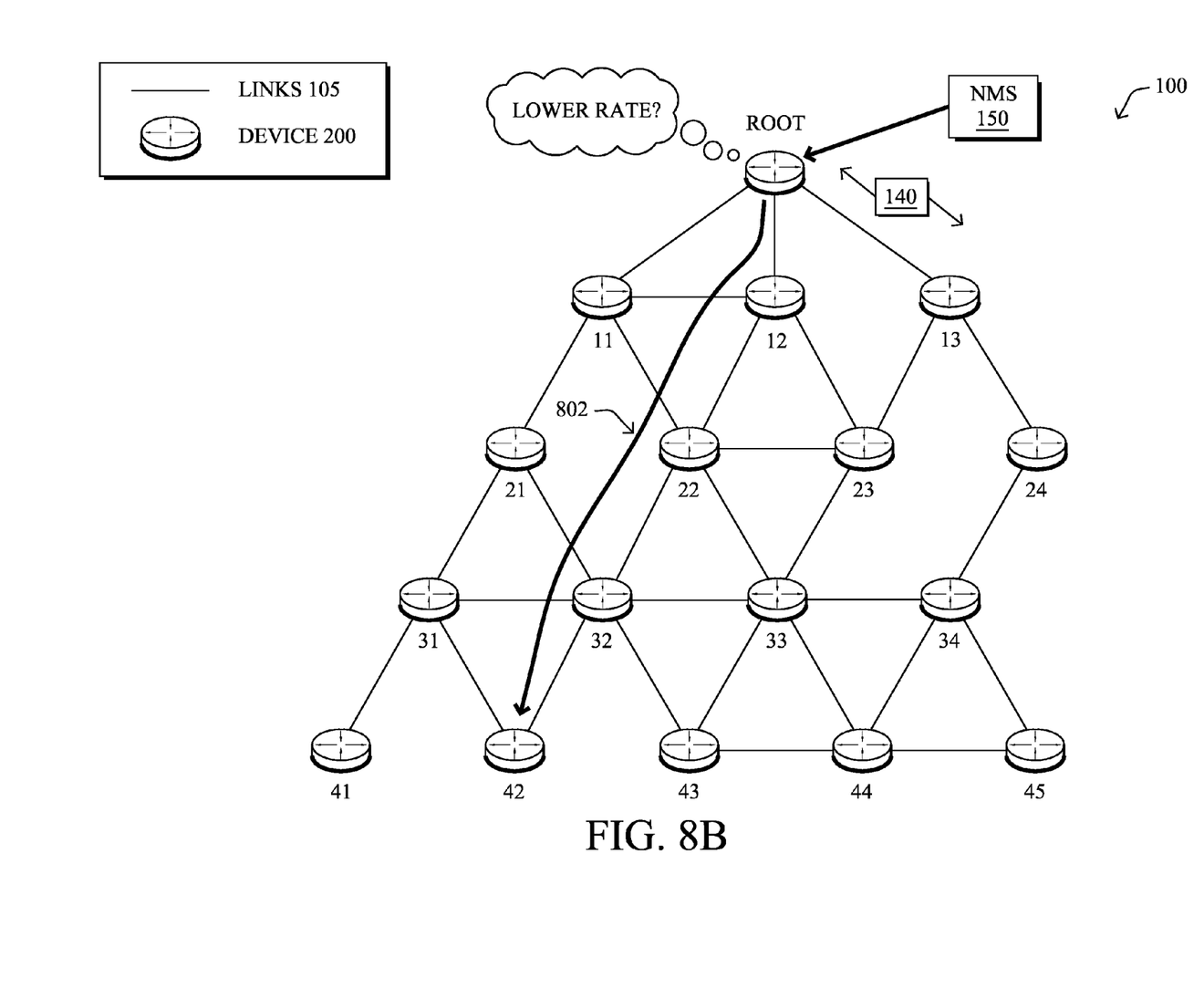

Based on the presence of self-interference along a given communication path in the network, a traffic shaping device may dynamically perform traffic shaping by adjusting a traffic shaping policy. Thus, a PCE, DODAG Root, or other device that acts as a traffic shaper may compute the degree of self-interference for packets along a given communication path and apply traffic shaping techniques to packets that utilize that path. An example of traffic shaping being performed along a path is shown in FIGS. 8A-8B. Assume in the example shown that the DODAG Root device acts as a traffic shaper and is attempting to forward packets along a path 802. If any adjacent links 105 along path 802 experience self-interference (e.g., the links between nodes 12, 22 and 22, 32), the Root device may decrease the transmission rate used by one half. In another example, if one of the links 105 along path 802 experiences self-interference with two adjacent links (e.g., the link between nodes 22, 32 exhibits self-interference with the links between nodes 12, 22 and nodes 32, 42), the Root device may decrease the data rate to one third. If there are multiple groups of links that experience self-interference along a path, the traffic rate may be reduced even further.

Figure 9A:
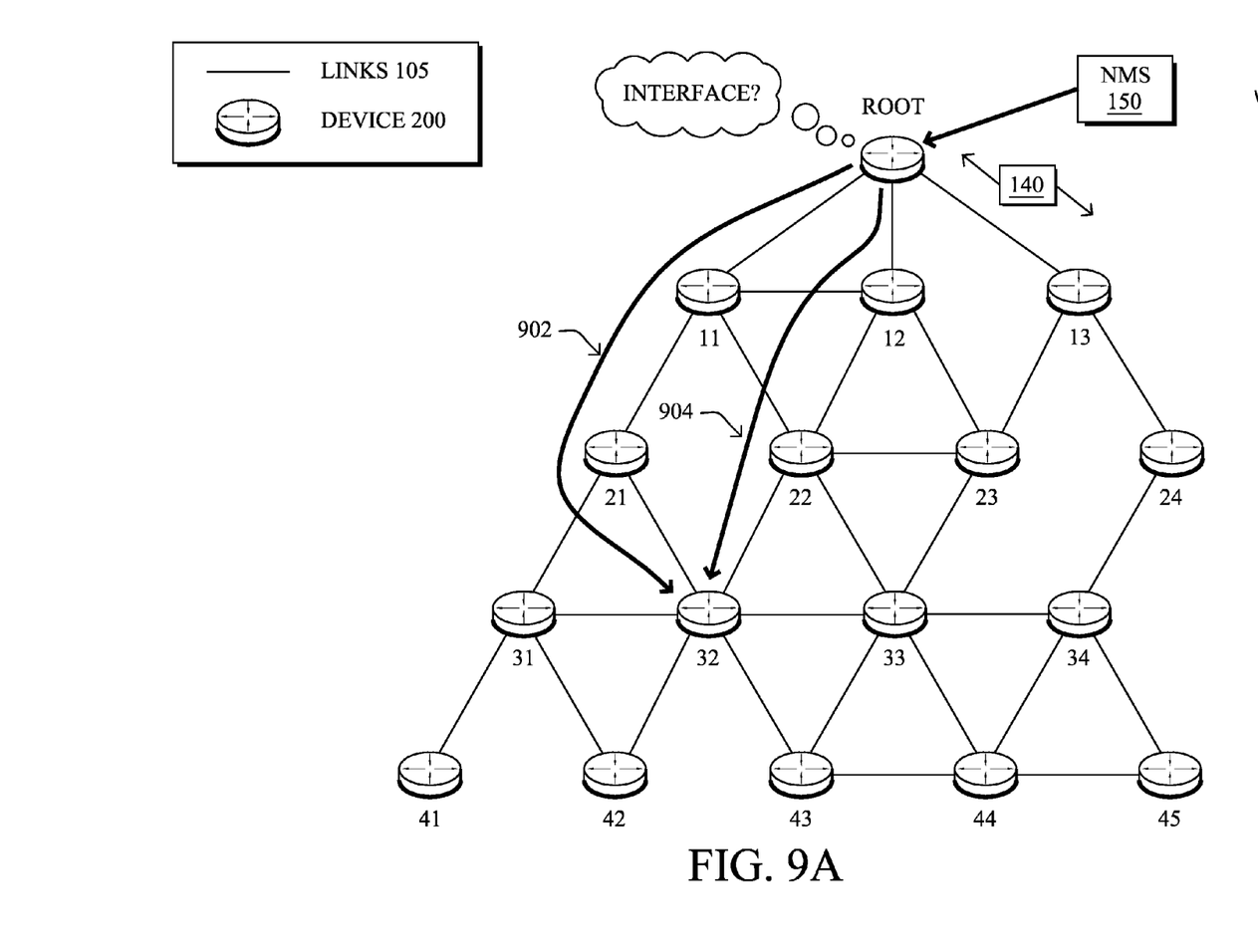
FIGS. 9A-9B illustrate an example of traffic shaping being performed along adjacent communication paths.
Figure 9B:
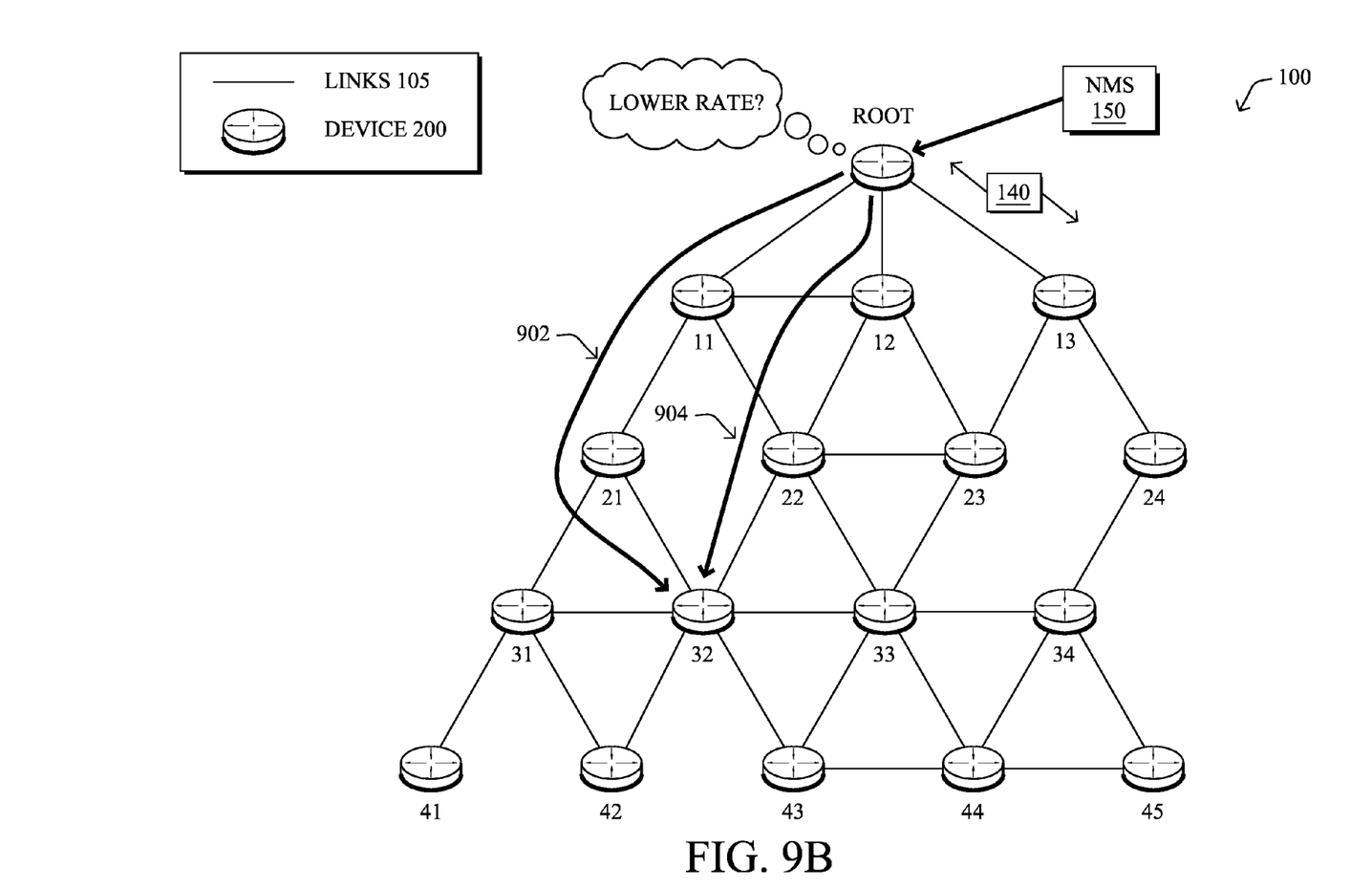

In some embodiments, the traffic shaper (e.g., the PCE/DODAG Root, etc.) may dynamically adjust the traffic shaper policy when delivering packets along different but adjacent paths. For example, as shown in FIGS. 9A-9B, assume that the Root device is attempting to send data packets via adjacent paths 902 and 904. As noted previously, adjacent communication paths in some shared media networks may experience self-interference due to crosstalk effects (e.g., crosstalk between different electrical phases in a PLC system, etc.). When the Root device uses the adjacent paths 902, 904 to deliver packets at the same time and it is determined that self-interference exists between the two paths, the Root may dynamically adjust the traffic shaper policies for those paths by further reducing the traffic rate. As with the previous example shown in FIGS. 8A-8B, the Root may adjust the traffic rate based on the degree of self-interference between the two adjacent paths, as measured by the number of links that experience self-interference, and/or the proximity of links that experience self-interference. For example, two links that experience self-interference are likely to amplify their effects of adding delay and variance when they are closer together along a path.

A device may perform traffic shaping by adjusting the scheduling of when the data is sent in addition to, or in lieu of, performing traffic shaping by adjusting a data rate for data transmittal. Still referring to FIGS. 9A-9B, assume that the Root device determines that paths 902 and 904 exhibit self-interference. In some cases, the Root device may adjust the scheduling of data transmissions by alternating the train of packets in terms of time schedule. For example, the Root device may send n-number of packets along path 902, and then send m-number of packets along path 904, return to sending packets along path 902, etc.

Figure 10:
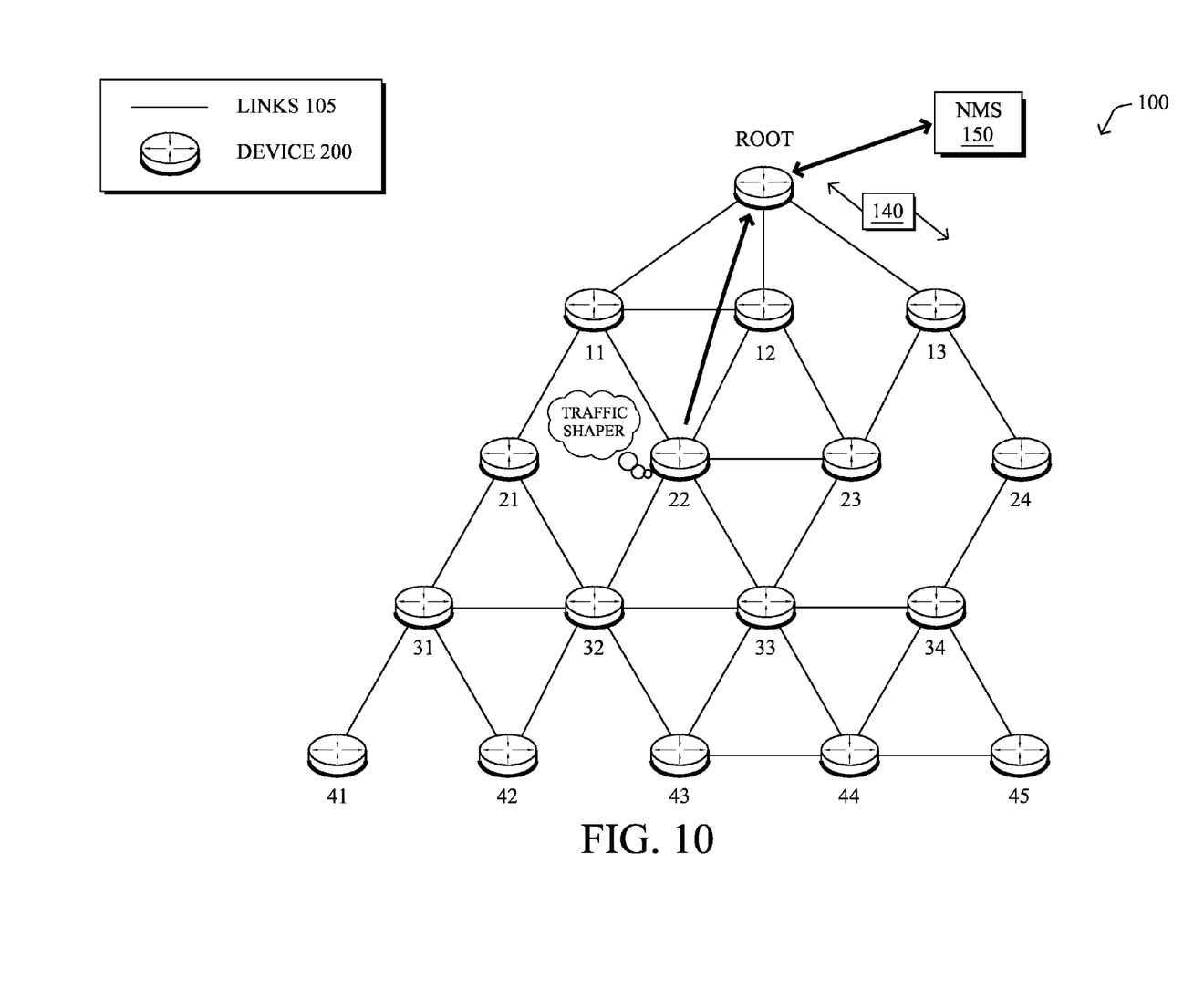
FIG. 10 illustrates an example of a traffic shaping device identifying itself to a network root.

In another embodiment, the traffic shaper functionality may be distributed among nodes in the LLN (i.e., not just on the Root or other supervisory device). A node may indicate to the Root (e.g., in a RPL DAO message or a new control message) that it implements traffic shaper functionality. For example, as shown in FIG. 10, node 22 may identify itself to the Root device that node 22 is capable of implementing traffic shaping. The Root could then dynamically enable or disable the traffic shaper functionality on any of the nodes that support such a mechanism.

Figure 11:
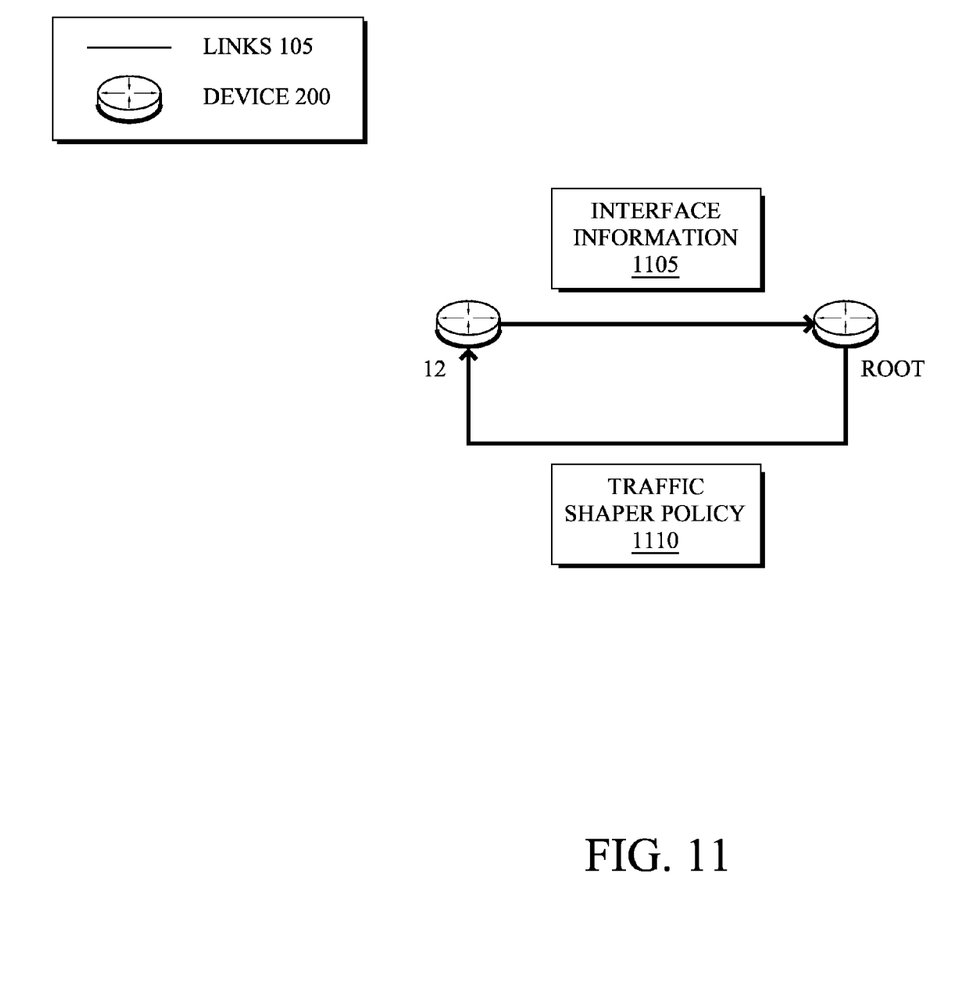
FIG. 11 illustrates example closed-loop control of traffic shaping.

While some aspects herein attempt to be proactive based on the self-interference reports from the nodes (e.g., as part of RPL DAO messages send at certain times), there may be cases where external conditions (e.g., external interference, etc.) can further amplify the effects of self-interference. Thus, in some cases, a traffic shaper device may also receive feedback from network nodes as part of a closed-loop control mechanism. For example, as shown in FIG. 11, the Root device may receive interference information 1105 from node 12 on an ongoing basis as part of a closed-loop mechanism. In response, the Root device may adjust traffic shaper policy 1110 imposed on node 12. In one embodiment, interference information 1105 may be sent if the degree of self-interference experienced by node 12 exceeds a threshold level.

Figure 12:
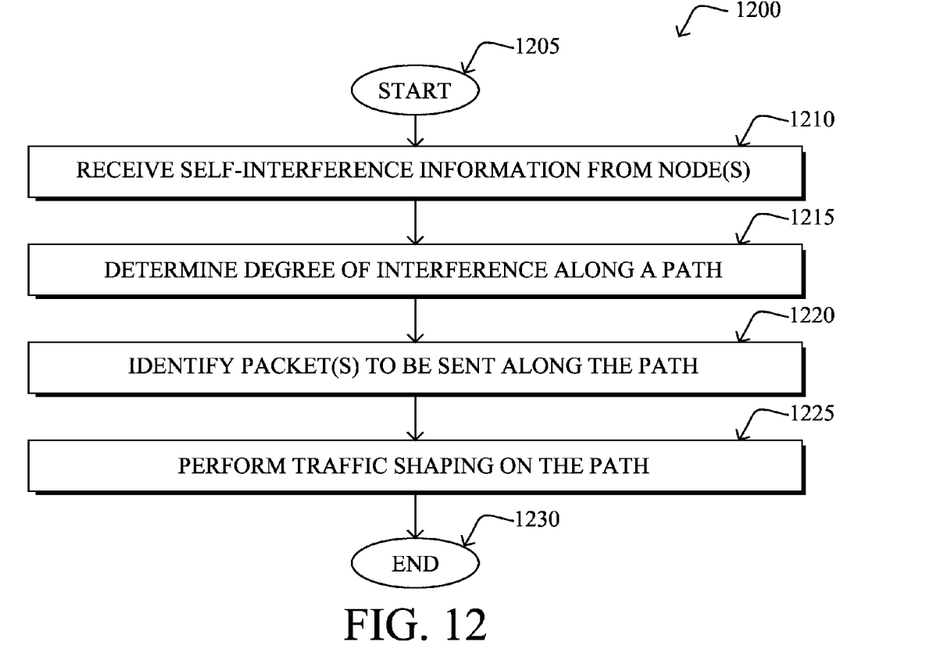
FIG. 12 illustrates an example simplified procedure for performing traffic shaping based on self-interference.

FIG. 12 illustrates an example simplified procedure for performing traffic shaping in a shared-media communication network based on self-interference, in accordance with one or more embodiments described herein. The procedure 1200 may start at step 1205, and continues to step 1210, where, as described in greater detail above, self-interference information is received at a traffic shaping device (e.g., a DODAG Root, PCE, node configured to operate as a traffic shaper, etc.) by one or more network nodes. As detailed above, the self-interference information may be included in a DAO message or any other message passed to the traffic shaping device.

At step 1215, a degree of self-interference along a path is determined based on the received interference information. As detailed above, the degree of self-interference along a path may be quantified in any number of ways. For example, the degree of self-interference along a path may be quantified as the total number of links along a path that experience self-interference, the highest number of adjacent links in the path that experience self-interference, a distribution of links in the path that experience self-interference, or the like.

At step 1220, one or more packets are identified that are going to be sent along the communication path. As detailed above, for example, a Root device may identify a train of packets that are going to be sent along a particular communication path.

At step 1225, traffic shaping is performed on the communication path based on the degree of self-interference along the path. As described in greater detail above, a traffic shaping may be performed by adjusting the data rate used to send the one or more packets from step 1220 and/or adjusting the scheduling of when the packet(s) are sent. For example, if two adjacent links along a communication path experience self-interference, the traffic shaping device may reduce the data rate used to send the packet(s) by half. Procedure 1230 then ends at step 1230.

Figure 13:
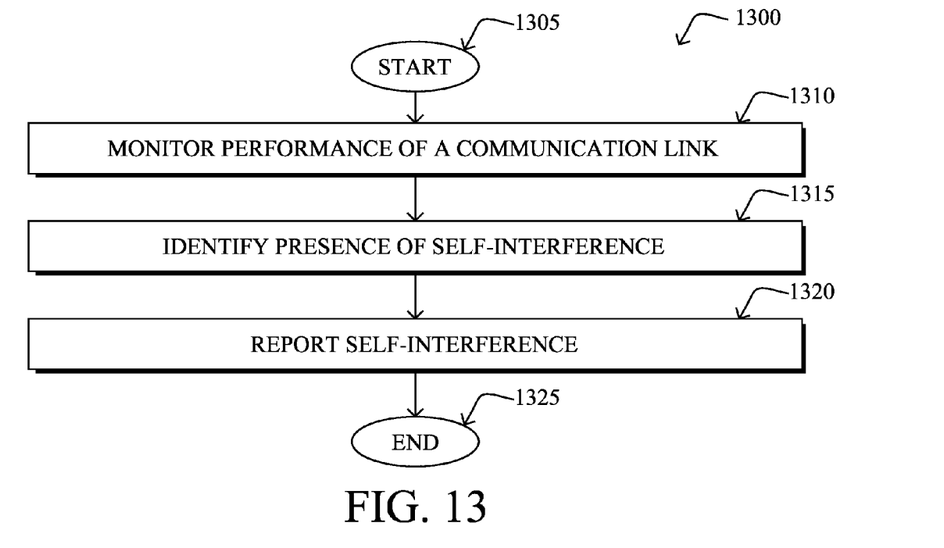
FIG. 13 illustrates an example simplified procedure for reporting self-interference to a traffic shaper.

FIG. 13 illustrates an example simplified procedure for reporting self-interference to a traffic shaping device, according to various embodiments. The procedure 1200 may start at step 1205, and continues to step 1210, where, as described in greater detail above, a communication link between a pair of network nodes is monitored. For example, a given node may monitor the performance of data sent to the node from its DODAG parent.

At step 1315, the presence of self-interference is identified. As described in detail above, various conditions may result in self-interference on a link. For example, the receiving device may be transmitting at the same time it is to receive a packet (e.g., in a half-duplex system), a given channel is used simultaneously by multiple devices within close proximity, cross-talk effects exists between different electrical phases, etc.

At step 1320, the network node/device then reports any identified self-interference to the traffic shaping device. For example, as described in greater detail above, interference information may be included in a DAO message, a message as part of a closed loop mechanism, a control message, or any other form of message. Also as described in greater detail above, the reported self-interference may include information regarding different communication media used by the node (e.g., wireless links, PLC links, etc.). Procedure 1300 then ends at step 1330.

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

The techniques described herein, therefore, provide for dynamically adjusting the traffic shaping policies based on the degree of self-interference for paths being used in an LLN. The degree of self-interference can vastly change the rate of traffic a path can deliver, where self-interference can reduce traffic rates to one-third or less, and the data rate may be adjusted accordingly. Thus, the techniques herein allow the better utilization of available network resources while avoiding issues caused by congestion (e.g., added latency, higher variance, reduced end-to-end reliability, inaccurate link-quality metrics, etc.).

While there have been shown and described illustrative embodiments that provide for dynamic enabling of routing devices in a shared-media communication network, it is to be understood that various other adaptations and modifications may be made within the spirit and scope of the embodiments herein. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a network operating as a traffic shaping device, self-interference information from one or more nodes in the network regarding at least a communication path traversing a first pair of the one or more nodes, wherein the self-interference information indicates that the first pair of nodes using a first electrical phase for power line communication over the communication path interfere with a second pair of the one or more nodes, being traversed by another communication path and using a second electrical phase different than the first phase, due to cross-talk between the first and second electrical phases;
determining, by the device, a degree of self-interference in terms of a number of links along the communication path experiencing self-interference and based on the received self-interference information;
identifying one or more packets to be sent along the communication path; and
performing, by the device, traffic shaping on the one or more packets by adjusting data rate of the one or more packets in proportion to the degree of self-interference.

2. The method as in claim 1, wherein the self-interference information from a particular node includes information regarding two or more different physical layers used by the one or more nodes for communication.

3. The method as in claim 1, wherein the degree of self-interference along the communication path corresponds to a distribution of links along the communication path that experience self-interference.

4. The method as in claim 1, wherein the adjusting the data rate comprises reducing the data rate.

5. The method as in claim 1, wherein the adjusting the data rate comprises delaying the one or more packets from being sent along the communication path.

6. The method as in claim 1, further comprising:
using feedback from the one or more nodes to perform closed loop control over the traffic shaping.

7. The method as in claim 1, wherein traffic shaping in the network is distributed among a plurality of devices in the network.

8. The method as in claim 1, further comprising:
adjusting a data rate for the another communication path to the communication path based on a determination that crosstalk effects exist between the paths.

9. A method comprising:
monitoring, by a network device, performance of a communication path traversing a first pair of one or more nodes of a network;
identifying the presence of self-interference associated with the communication path, wherein the self-interference information indicates that the first pair of nodes using a first electrical phase for power line communication over the communication path interfere with a second pair of the one or more nodes, being traversed by another communication path and using a second electrical phase different than the first phase, due to cross-talk between the first and second electrical phases;
reporting the self-interference to a traffic shaping device;
wherein a degree of self-interference is determined at the traffic shaping device in terms of a number of links along the communication path experiencing self-interference and based on the reported self-interference information; and wherein traffic shaping, on one or more packets communicated along the communication path, is performed at the traffic shaping device by reducing data rate of the one or more packets in proportion to the degree of self-interference.

10. An apparatus, comprising:
one or more network interfaces to communicate with a low power and lossy network (LLN);
a processor coupled to the network interfaces and adapted to execute one or more processes; and
a memory configured to store a process executable by the processor, the process when executed operable to:
receive self-interference information from one or more nodes in the LLN regarding at least a communication path traversing a first pair of the one or more nodes, wherein the self-interference information indicates that the first pair of nodes using a first electrical phase for power line communication over the communication path interfere with a second pair of the one or more nodes, being traversed by another communication path and using a second electrical phase different than the first phase, due to cross-talk between the first and second electrical phases;
determine a degree of self-interference in terms of a number of links along the communication path experiencing self-interference and based on the received self-interference information;
identify one or more packets to be sent along the communication path; and
perform traffic shaping on the one or more packets by adjusting data rate of the one or more packets in proportion to the degree of self-interference.

11. The apparatus as in claim 10, wherein the self-interference information from a particular node includes information regarding two or more different physical layers used by the one or more nodes for communication.

12. The apparatus as in claim 10, wherein the degree of self-interference along the communication path corresponds to a distribution of links along the communication path that experience self-interference.

13. The apparatus as in claim 10, wherein the degree of self-interference along the communication path corresponds to a distribution of links along the path that experience self-interference.

14. The apparatus as in claim 10, wherein the adjusting the data rate comprises reducing the data rate.

15. The apparatus as in claim 10, wherein the adjusting the data rate comprises delaying the one or more packets from being sent along the communication path.

16. The apparatus as in claim 10, wherein the process when executed is further operable to:
use feedback from the one or more nodes to perform closed loop control over the traffic shaping.

17. The apparatus as in claim 10, wherein traffic shaping in the network is distributed among a plurality of devices in the network.

18. The apparatus as in claim 10, wherein the process when executed is further operable to:
adjust a data rate for the another communication path to the communication path based on a determination that crosstalk effects exist between the paths.

19. An apparatus, comprising:
one or more network interfaces to communicate with a low power and lossy network (LLN);
a processor coupled to the network interfaces and adapted to execute one or more processes; and
a memory configured to store a process executable by the processor, the process when executed operable to:
monitor performance of a communication path traversing a first pair of one or more nodes of LLN;
identifying the presence of self-interference associated with the communication path, wherein the self-interference information indicates that the first pair of nodes using a first electrical phase for power line communication over the communication path interfere with a second pair of the one or more nodes, being traversed by another communication path and using a second electrical phase different than the first phase, due to cross-talk between the first and second electrical phases;
reporting the self-interference to a traffic shaping device;
wherein a degree of self-interference is determined at the traffic shaping device in terms of a number of links along the communication path experiencing self-interference and based on the reported self-interference information; and
wherein traffic shaping, on one or more packets communicated along the communication path, is performed at the traffic shaping device by reducing data rate of the one or more packets in proportion to the degree of self-interference.

* * * * *